(12) United States Patent
Vosoughi et al.

(10) Patent No.: US 11,210,813 B2
(45) Date of Patent: Dec. 28, 2021

(54) METHOD AND APPARATUS FOR POINT CLOUD COMPRESSION

(71) Applicant: TENCENT AMERICA LLC, Palo Alto, CA (US)

(72) Inventors: Arash Vosoughi, Palo Alto, CA (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/887,928

(22) Filed: May 29, 2020

(65) Prior Publication Data

US 2020/0380731 A1 Dec. 3, 2020

Related U.S. Application Data

(60) Provisional application No. 62/854,951, filed on May 30, 2019.

(51) Int. Cl.
*G06T 9/00* (2006.01)
(52) U.S. Cl.
CPC ...................... *G06T 9/00* (2013.01)
(58) Field of Classification Search
None
See application file for complete search history.

(56) References Cited

U.S. PATENT DOCUMENTS

| 2009/0003448 | A1* | 1/2009 | Sekiguchi | H04N 19/11 |
| | | | | 375/240.16 |
| 2014/0177971 | A1* | 6/2014 | Strom | H04N 19/428 |
| | | | | 382/232 |
| 2016/0373745 | A1* | 12/2016 | Joshi | H04N 19/13 |
| 2020/0020132 | A1* | 1/2020 | Sinharoy | H03M 7/3059 |

OTHER PUBLICATIONS

Christian Tulvan et al., "Use Cases for Point Cloud Compression (PCC)", International Organisation for Standardisation Organisation Internationale De Normalisation ISO/IEC JTC1/SC29/WG11 Coding of Moving Pictures and Audio, ISO/IEC JTC1/SC29/WG11 MPEG2015/N16331, Geneva, CH, Jun. 2016 (8 pages).

(Continued)

*Primary Examiner* — Yi Wang
(74) *Attorney, Agent, or Firm* — Oblon, McClelland, Maier & Neustadt, L.L.P.

(57) ABSTRACT

According to some aspects of the disclosure, processing circuitry for point cloud decompression can decode prediction information of an image from a coded bitstream corresponding to a point cloud. The prediction information indicates that the image includes a first portion corresponding to patches in the point cloud, and a second portion corresponding to missed points by the patches from the point cloud. The processing circuitry can scan the second portion of the image according to a non-jumpy scan to obtain the missed points in a sequence, and reconstruct the point cloud based on reconstructed patches corresponding to the patches and reconstructed missed points based on the sequence of the missed points.

20 Claims, 14 Drawing Sheets

(56) References Cited

OTHER PUBLICATIONS

Rufael Mekuria et al., "Requirements for Point Cloud Compression", International Organisation for Standardisation Organisation Internationale De Normalisation ISO/IEC JTC1/SC29/WG11 Coding of Moving Pictures and Audio, ISO/IEC JTC1/SC29/WG11 MPEG2016/n16330, Geneva, CH, Feb. 2016 (3 pages).

Khaled Mammou et al., "Point Cloud Compression: Test Model Category 2 version 0.0", Source: Apple Inc, International Organisation for Standardisation Organisation Internationale De Normalisation ISO/IEC JTC1/SC29/WG11 Coding of Moving Pictures and Audio, ISO/IEC JTC1/SC29/WG11 m41920, Macau, China, Oct. 2017 (8 pages).

Vladyslav Zakharchenko, "Algorithm description of mpeg-pcc-tmc2 (v-pcc)", International Organisation for Standarisation Organisation Internationale De Normalisation ISO/IEC JTC1/SC29/WG11 Coding of Moving Pictures and Audio, ISO/IEC JTC1/SC29/WG11 MPEG2018/N17767, Source: 3DG, Ljubljana, SI, Jul. 2018 (22 pages).

* cited by examiner

```
flexible_missed_points_scan_metadata(){
    if(flexible_missed_points_scan_enabled_flag){
        non_jumpy_raster_scan_present_flag
        block_based_scan_present_flag
        if(non_jumpy_raster_scan_present_flag){
            non_jumpy_raster_scan
        }
        if(block_based_scan_present_flag){
            block_size
        }
    }
}
```

*FIG. 10*

METHOD AND APPARATUS FOR POINT CLOUD COMPRESSION

INCORPORATION BY REFERENCE

This present application claims the benefit of priority to U.S. Provisional Application No. 62/854,951, "TECHNIQUES AND APPARATUS FOR ENHANCED PCM PATCH CODING FOR POINT CLOUD COMPRESSION" filed on May 30, 2019, which is incorporated by reference herein in its entirety.

TECHNICAL FIELD

The present disclosure describes embodiments generally related to point cloud compression.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent world, such as objects in the world, environments in the world, and the like in 3-dimensional (3D) space. 3D representations of the world can enable more immersive forms of interaction and communication. Point clouds can be used as 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods and apparatuses for point cloud compression and decompression. In some examples, an apparatus for point cloud compression/decompression includes processing circuitry.

For example, the processing circuitry for compression can determine missed points in a point cloud that are missed from one or more patches of the point cloud. Then, the processing circuitry forms an image having a first portion corresponding to the one or more patches and a second portion corresponding to the missed points. The missed points are ordered in a sequence, and are arranged in the second portion based on a non-jumpy scan. The processing circuitry then encodes the image and forms a coded bitstream that includes the encoded image.

In some embodiments, the processing circuitry orders the missed points into the sequence of missed points based on a nearest neighbor criterion, and associates the sequence of missed points to pixels of in the second portion according to the non-jumpy scan.

In an embodiment, the processing circuitry associates a first missed point to a last pixel in a first row of the second portion, and associates a second missed point that is next to the first missed point in the sequence of missed points to a first pixel in a second row of the second portion. The last pixel in the first row and the first pixel in the second row are in a same column.

In some embodiments, the second portion is divided into blocks, and block based non-jumpy scan can be used. The processing circuitry associates a first missed point to a last pixel in a first row of a block in the second portion, and associates a second missed point that is next to the first missed point in the sequence of missed points to a first pixel in a second row of the block in the second portion. The last pixel in the first row and the first pixel in the second row are in a same column.

In some examples, the processing circuitry can include a flag indicative of the non-jumpy scan in the coded bitstream, and can include a block size in the coded bitstream for the block based non-jumpy scan. In some examples, the non-jumpy scan and/or the block size for the block based non-jumpy scan can be inferred.

In some embodiments, the processing circuitry disposes the second portion of a rectangular shape into the image with a top-left corner of the second portion having both a horizontal coordinate and a vertical coordinate being multiples of the block size.

According to some aspects of the disclosure, the processing circuitry for point cloud decompression can decode prediction information of an image from a coded bitstream corresponding to a point cloud. The prediction information indicates that the image includes a first portion corresponding to patches in the point cloud, and a second portion corresponding to missed points by the patches from the point cloud. The processing circuitry can scan the second portion of the image according to a non-jumpy scan to obtain the missed points in a sequence, and reconstruct the point cloud based on reconstructed patches corresponding to the patches and reconstructed missed points based on the sequence of the missed points.

In some embodiments, the processing circuitry obtains a first missed point as a last pixel of a first row in the second portion, and a second missed point that is next to the first missed point in the sequence as a first pixel of a second row in the second portion. The last pixel of the first row and the first pixel of the second row are in a same column.

In some examples, the processing circuitry decodes a flag that is indicative of the non-jumpy scan or a block based non-jumpy scan from the coded bitstream. The processing circuitry can also decode a block size for the block based non-jumpy scan from the coded bitstream. In some other examples, the processing circuitry can infer the non-jumpy scan, or the block based non-jumpy scan, and may also infer the block size.

For block based non-jumpy scan, the processing circuitry can divide the second portion into blocks according to a block size, and scan missed points within a block according to the non-jumpy scan. In some embodiments, a top-left corner of the second portion in a rectangular shape has both a horizontal coordinate and a vertical coordinate being multiples of the block size. In an embodiment, the processing circuitry scans a first missed point as a last pixel in a first row of the block, and a second missed point that is adjacent to the first missed point in the sequence as a first pixel in a second row of the block. The last pixel in the first row and the first pixel in the second row are in a same column. The processing circuitry can also process the blocks in an order according to the non-jumpy scan of the blocks.

Aspects of the disclosure also provide a non-transitory computer-readable medium storing instructions which when executed by a computer for point cloud compression/decompression cause the computer to perform the method for point cloud compression/decompression.

BRIEF DESCRIPTION OF THE DRAWINGS

Further features, the nature, and various advantages of the disclosed subject matter will be more apparent from the following detailed description and the accompanying drawings in which:

FIG. 10 shows a syntax example according to some embodiments of the disclosure.

DETAILED DESCRIPTION OF EMBODIMENTS

Figure 1:
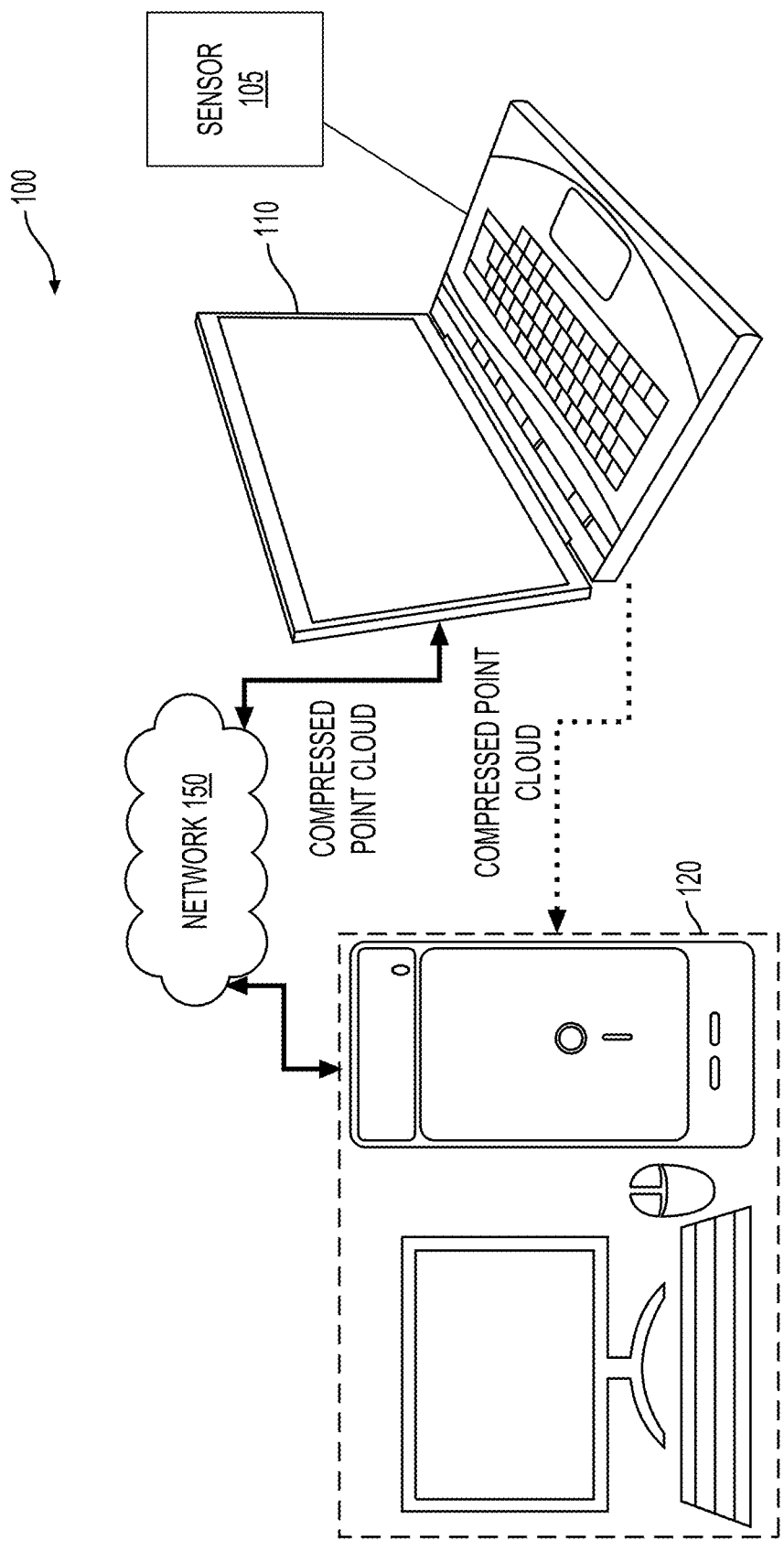
FIG. 1 is a schematic illustration of a simplified block diagram of a communication system (100) in accordance with an embodiment.

Aspects of the disclosure provide point cloud coding (PCC) techniques. PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. Moving picture experts group (MPEG) is working on G-PCC standard and V-PCC standard that respectively using the G-PCC scheme and the V-PCC scheme. The present disclosure provides techniques which can be used in both lossless and lossy compression of pulse code modulation (PCM) patch within the framework of V-PCC and G-PCC standards.

It is noted that while the disclosed techniques, such as the color transfer algorithms, are described in the context with V-PCC, the disclosed techniques can be used suitably with G-PCC.

Hereinafter, a point cloud generally may refer to a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras and depth sensors in various setups and may be made up of thousands up to billions of points in order to realistically represent reconstructed scenes. A patch generally may refer to a contiguous subset of the surface described by the point cloud. In an example, a patch includes points with surface normal vectors that deviate from one another less than a threshold amount. A missed point generally may refer to a point not captured by the V-PCC projection.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like. Moving picture experts group (MPEG) starts working on a standard to address compression of geometry and attributes such as colors and reflectance, scalable/progressive coding, coding of sequences of point clouds captured over time, and random access to subsets of the point cloud.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) that perform unidirectional transmission of point cloud data. For example, the terminal device (110) may compress point cloud (e.g., points representing a structure) that are captured by a sensor 105 connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud and suitably display according to the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
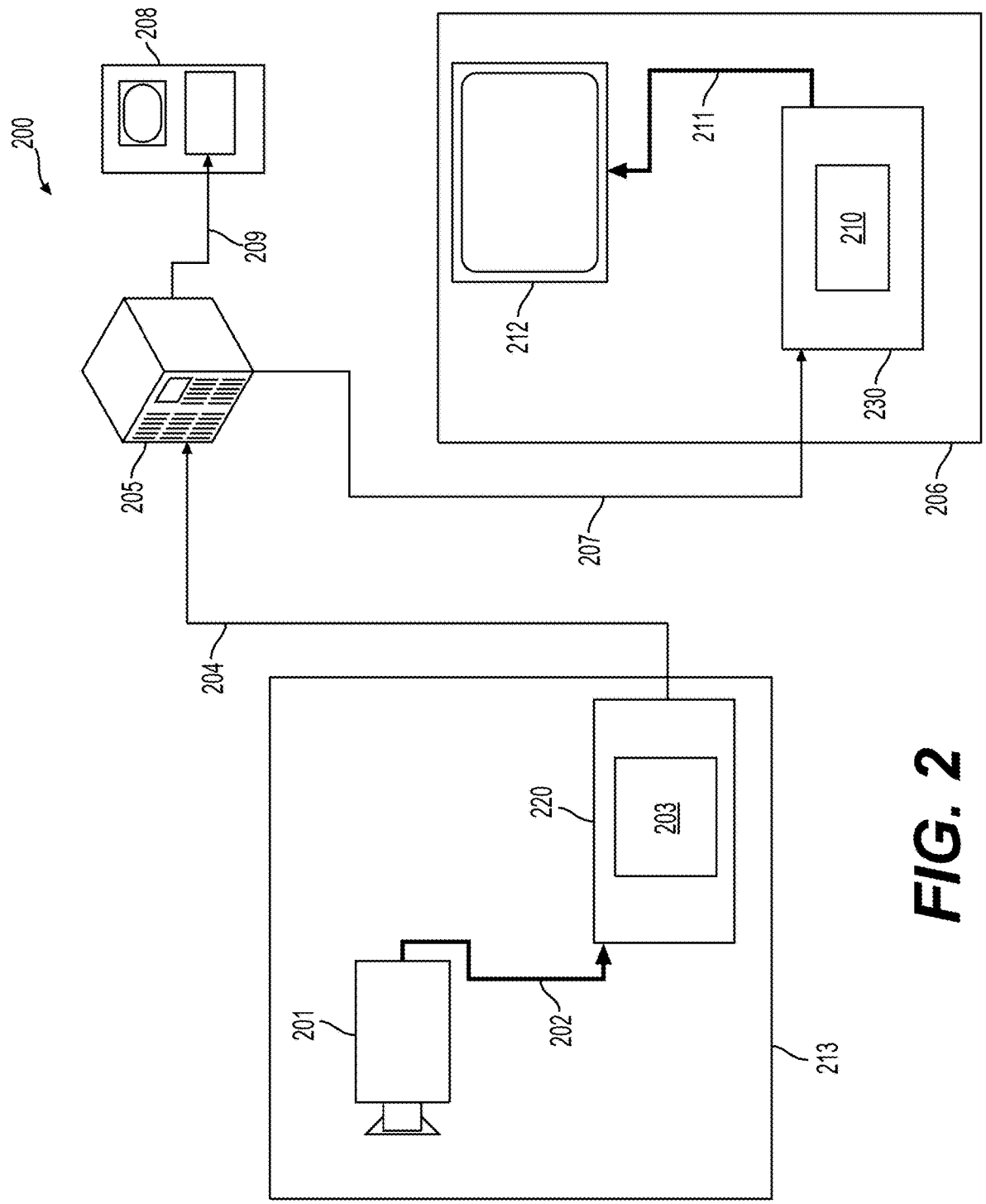
FIG. 2 is a schematic illustration of a simplified block diagram of a streaming system (200) in accordance with an embodiment.

FIG. 2 illustrates, as an example for an application for the disclosed subject matter for point cloud. The disclosed subject matter can be equally applicable to other point cloud enabled applications, including, 3D telepresence application, virtual reality application.

A streaming system 200 may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212). In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

It is noted that the electronic devices (220) and (230) can include other components (not shown). For example, the electronic device (220) can include a decoder (not shown) and the electronic device (230) can include an encoder (not shown) as well.

Figure 3:
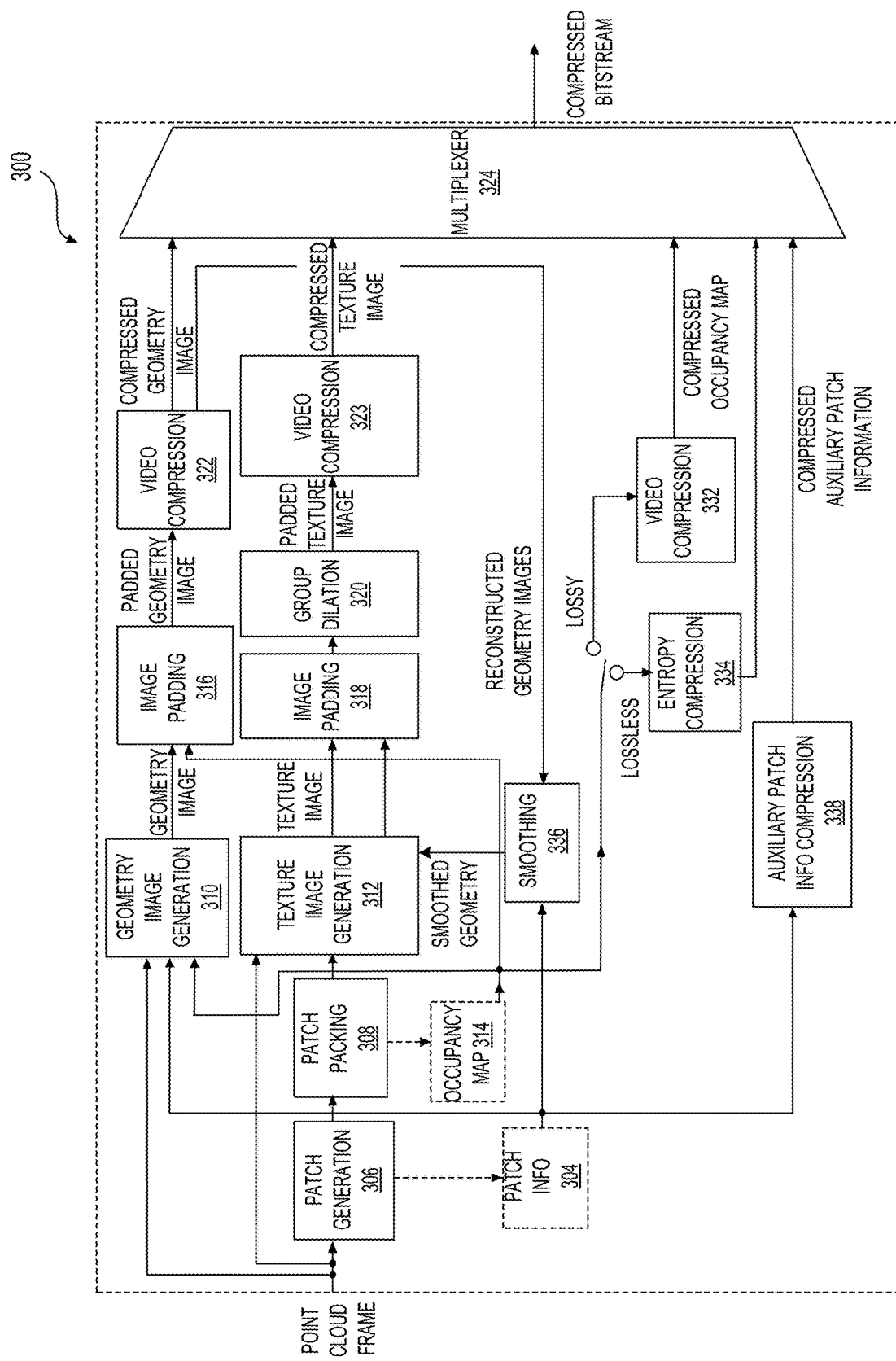
FIG. 3 shows a block diagram of an encoder (300) for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames that are uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module 306, a patch packing module 308, a geometry image generation module 310, a texture image generation module 312, a patch info module 304, an occupancy map module 314, a smoothing module 336, image padding modules 316 and 318, a group dilation module 320, video compression modules 322, 323 and 332, an auxiliary patch info compression module 338, an entropy compression module 334 and a multiplexer 324 coupled together as shown in FIG. 3.

According to an aspect of the disclosure, the V-PCC encoder (300), converts 3D point cloud frames into an image-based representation along with some meta data (e.g., occupancy map and patch info) necessary to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module 338 to generate the compressed auxiliary patch information.

The patch packing module 308 is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module 310 and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module 314 can generate an occupancy map that describes padding information at each unit. For example, the occupancy image includes of a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module 314 can be compressed using lossless coding or lossy coding. When lossless coding is used, the entropy compression module 334 is used to compress the occupancy map; when lossy coding is used, the video compression module 332 is used to compress the occupancy map.

It is noted that the patch packing module 308 may leave some empty spaces between 2D patches packed in an image frame. The image padding module 316 and 318 can fill the empty spaces (referred to as padding) in order to generate an image frame that may be suited for 2D video and image codecs. The image padding is also referred to as background filling which can fill the unused space by redundant information. In some examples, a good background filling minimally increases the bit rate while does not introduce significant coding distortion around the patch boundaries.

The video compression modules 322, 323 and 332 can encode the 2D images, such as the padded geometry images, padded texture images, and occupancy maps based on a suitable video coding standard, such as HEVC, VVC and the like. In an example, the video compression modules 322, 323 and 332 are individual components that operate separately. It is noted that the video compression modules 322, 323 and 332 can be implemented as a single component in another example.

In some examples, the smoothing module 336 is configured to generate a smoothed image of the reconstructed geometry image. The smoothed image information can be provided to the texture image generation 312. Then, the texture image generation 312 may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation 320 is configured to pad pixels around the object boundaries with redundant low-frequency content in order to improve coding gain as well as visual quality of reconstructed point cloud.

The multiplexer 324 can multiplex the compressed geometry image, the compressed texture image, the compressed occupancy map, the compressed auxiliary patch information into a compressed bitstream.

Figure 4:
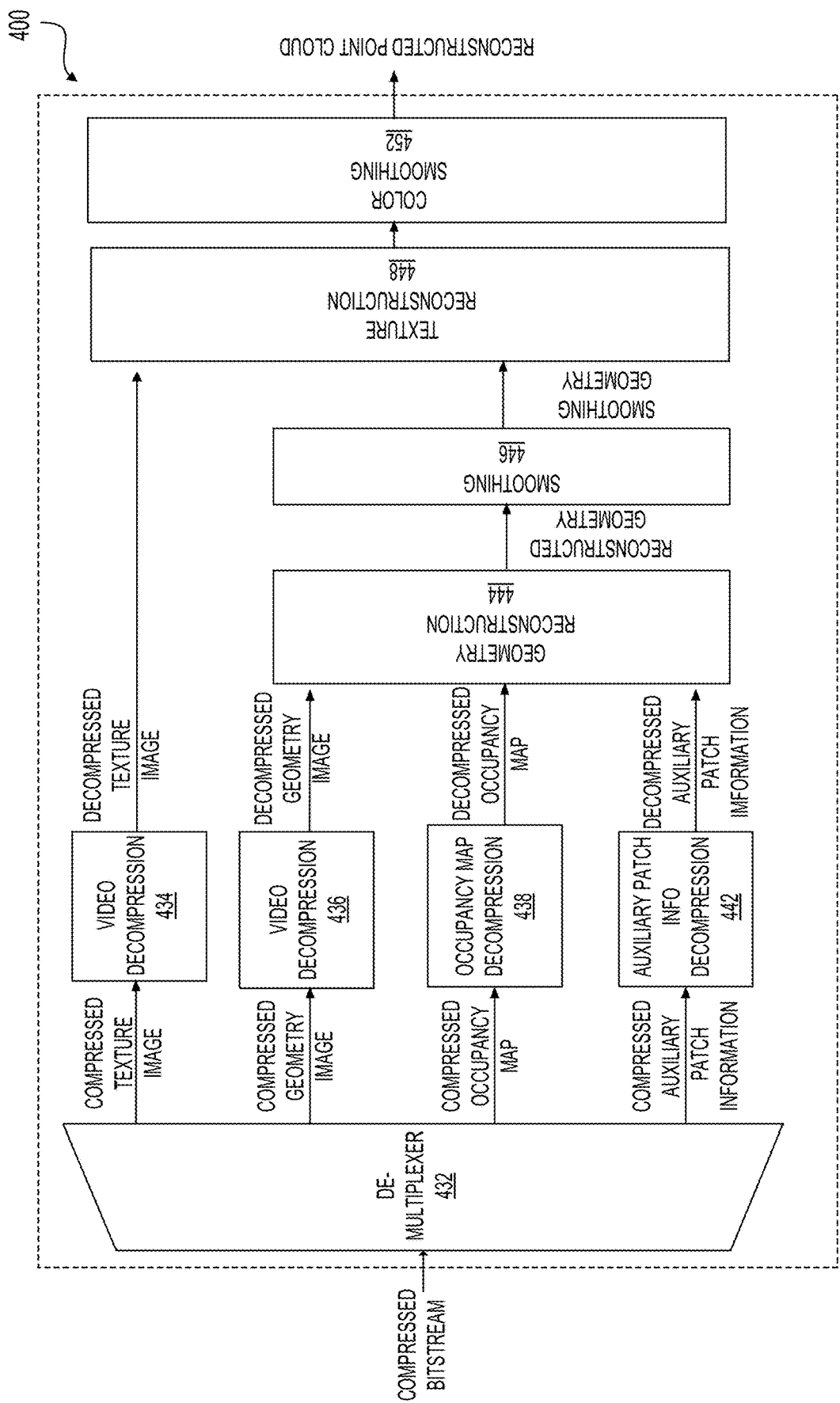
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured and operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448) and a color smoothing module (452) coupled together as shown in FIG. 4.

The de-multiplexer (432) can receive the compressed bitstream and separate into compressed texture image, compressed geometry image, compressed occupancy map and compressed auxiliary patch information.

The video decompression modules (434) and (436) can decode the compressed images according to suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to suitable standard (e.g., HEVC, VVC, etc.) and output decompressed occupancy maps.

The auxiliary patch-information decompression module (442) can decode the compressed auxiliary patch information according to suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
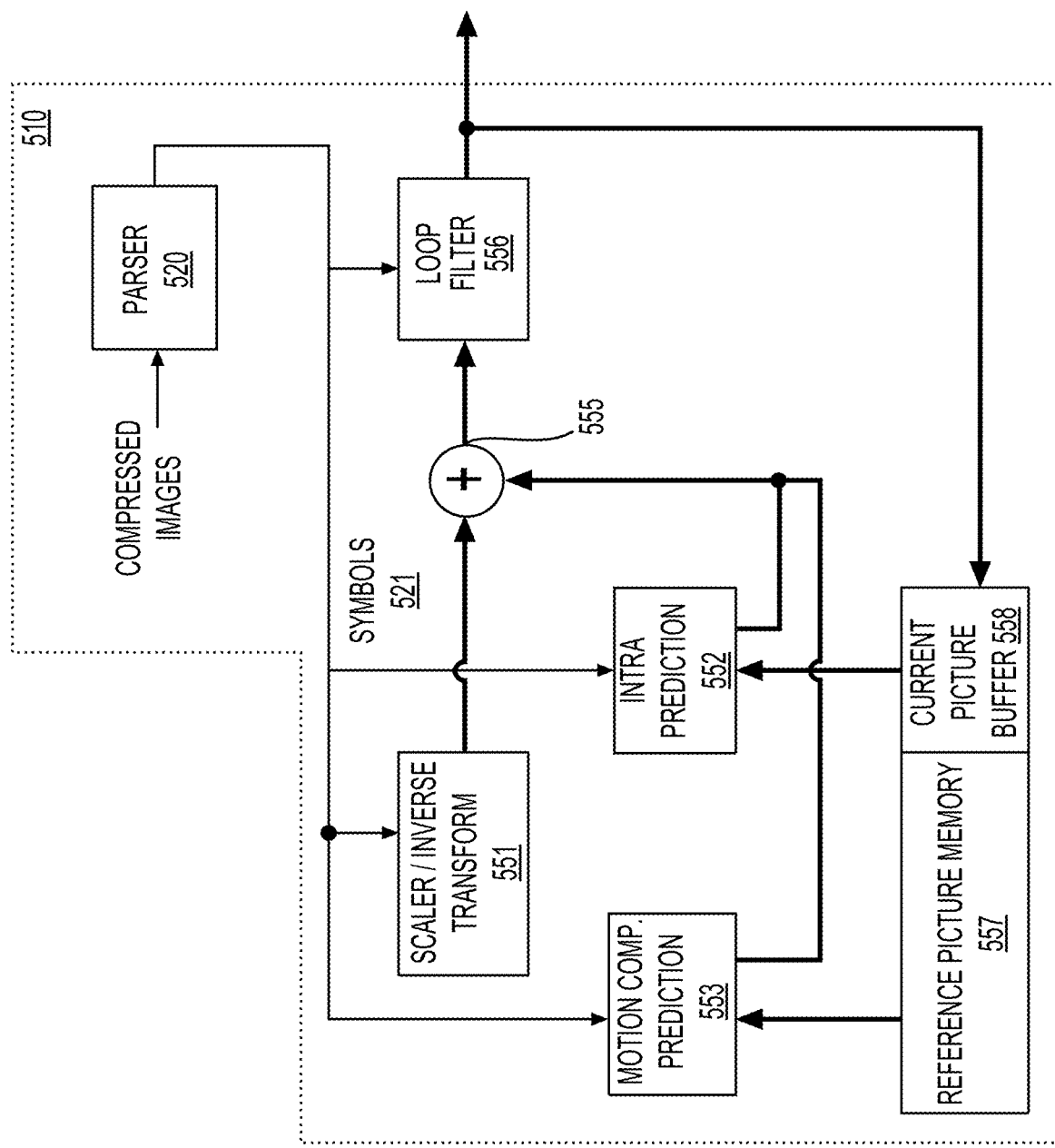
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
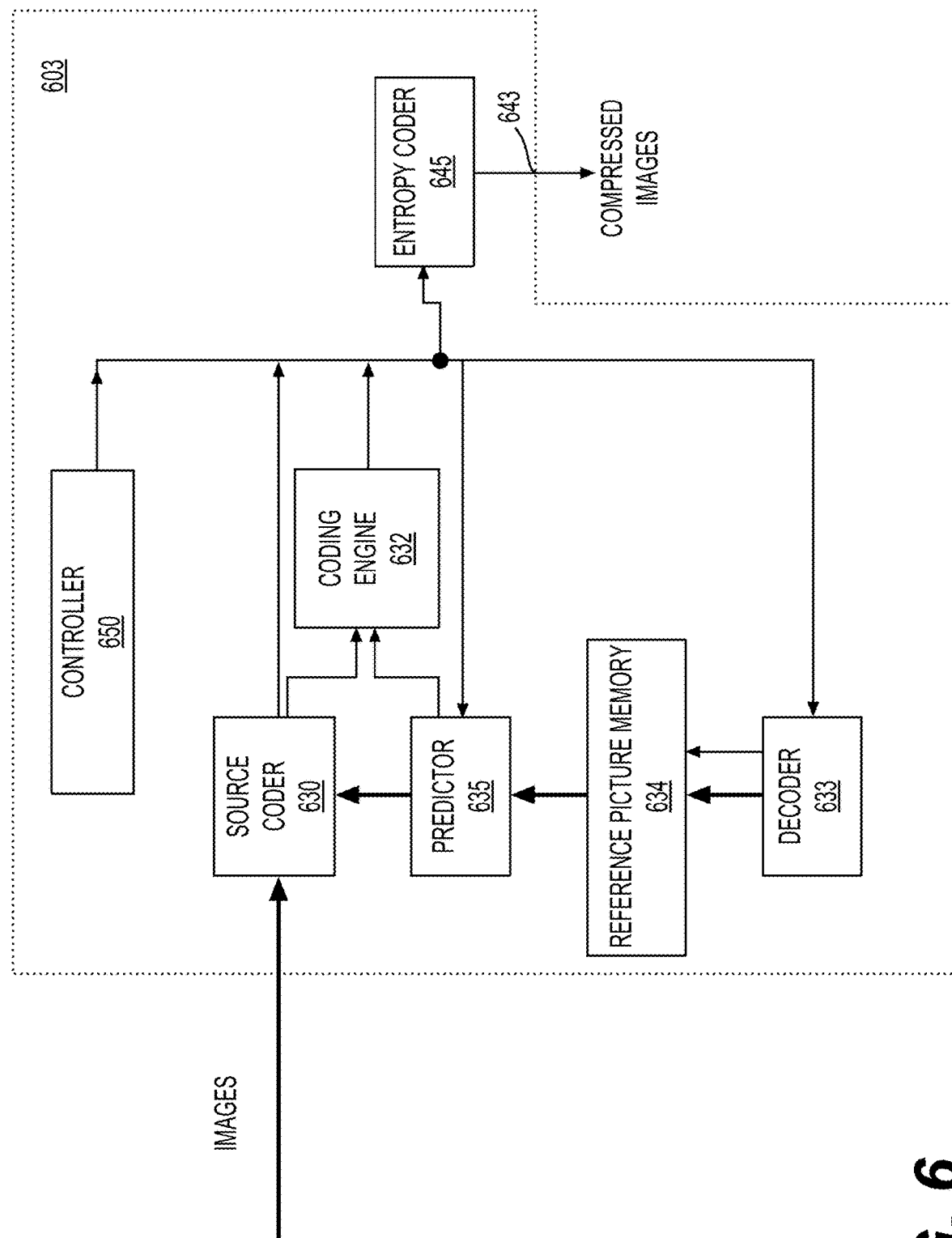
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) the compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

According to some aspects of the disclosure, due to occlusion, the V-PCC projection approach may not capture every point, and the points that are missed by the V-PCC projection approach are referred to as missed points. In some examples, the missed points typically belong to random locations in 3D space and lack high geometry and color correlations. In some examples, V-PCC collects the missed points and creates two of one dimensional (1D) signals, such as a geometry signal and a color signal that are respectively one dimensional signals. Further, each of these 1D signals can be packed as a separate 2D image that is referred to as a pulse code modulation (PCM) patch and compressed by HEVC afterwards in some examples. The present disclosure provide techniques for the arrangements of the 1D signals into 2D images that are amenable for 2D compression tools (like HEVC).

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In some examples, after the patch generation, according to V-PCC, missed points are scanned from the patches in 3D, the geometry and color values of the missed points can be packed as PCM patch at the bottom of the geometry and texture images. In an example, a Kd-tree is created over the missed points and the missed points are scanned to form 1D signals based on the nearest neighborhood criteria. The scanning result includes a geometry signal and a color signal that are respectively one dimensional. For example, the missed points are sorted according to the scan of the Kd-tree based on the nearest neighborhood criteria. The geometry signal includes a sequence of geometry samples for the sorted missed points, and the color signal includes a sequence of color values for the sorted missed points. In some portions of the present disclosure, the geometry signal is used as an example for ease of description of techniques, and the disclosed techniques on the geometry signal can be similarly used on the color signal.

Further, according to an aspect of the disclosure, the 1D geometry signal is packed in the form of a rectangle at the bottom of the geometry image, and the 1D color signal is packed similarly at the bottom of the texture images. In some examples, for the 1D geometry signal, the x, y and z values of a point can be sequentially put in a position. For the 1D color signal, color values can occupy three color planes. In an example, the R, G, B values of a point can be respectively put at corresponding locations in R plane, G plane and B plane.

Figure 7:
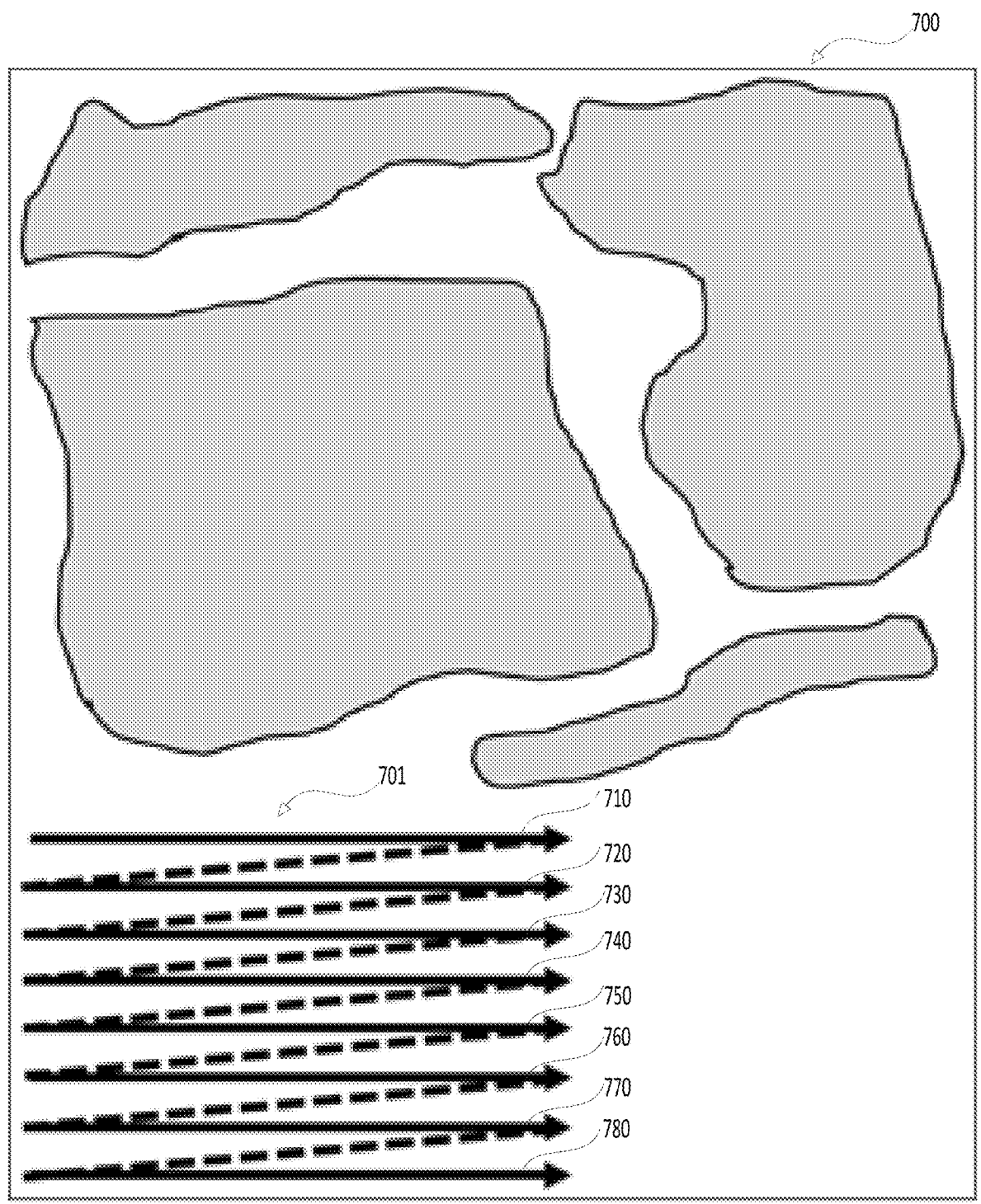
FIG. 7 shows a diagram illustrating a two-dimensional (2D) image.

FIG. 7 shows a diagram illustrating a two-dimensional (2D) image 700 and a portion (701) with an arrangement of a geometry signal of 1D. The 2D image (700) can be a geometry image or one of the texture images for a point cloud, and the geometry image can be used for example. The 2D image (700) includes an upper portion that corresponds to one or more patches, such as geometry information of points in the one or more patches. The 2D image (700) includes the portion (701) that is disposed at a bottom portion of the 2D image (700), the portion (701) corresponds to missed points by the one or more patches from the point cloud.

In the portion (701) as shown, squares represent pixels of the image (either geometry or texture image) for the missed points. Samples (corresponding to the missed points) are put in each row starting from the beginning of the row to the end. There is jump (a relatively large distance between adjacent samples) between consecutive rows.

Specifically, in the portion (701), the geometry signal of 1D missed points is arranged into 2D following an order of arrow lines (710), (720), (730), (740), (750), (760), (770) and (780). Specifically, arrow line (710) indicates an arrangement of the first 12 geometry samples in the geometry signal into a first row of pixels of the portion (701) from left to right; arrow line (720) indicates an arrangement of the second 12 geometry samples in the geometry signal into a second row of pixels of the portion (701) from left to right; arrow line (730) indicates an arrangement of the third 12 geometry samples in the geometry signal into a third row of pixels of the portion (701) from left to right; arrow line (740) indicates an arrangement of the fourth 12 geometry samples in the geometry signal into a fourth row of pixels of the portion (701) from left to right; arrow line (750) indicates an arrangement of the fifth 12 geometry samples in the geometry signal into a fifth row of pixels of the portion (701) from left to right; arrow line (760) indicates an arrangement of the sixth 12 geometry samples in the geometry signal into a sixth row of pixels of the portion (701) from left to right; arrow line (770) indicates an arrangement of the seventh 12 geometry samples in the geometry signal into a seventh row of pixels of the portion (701) from left to right; and arrow line (780) indicates an arrangement of the eighth 12 geometry samples in the geometry signal into an eighth row of pixels of the portion (701) ge from left to right.

In the FIG. 7 example, the arrow lines (710), (720), (730), (740), (750), (760), (770) and (780) correspond to horizontal scan order for arranging the geometry samples in the geometry signal. All of the arrow lines (710), (720), (730), (740), (750), (760), (770) and (780) are from left to right. When adjacent geometry samples in the 1D geometry signal are disposed at pixels in the same row, the horizontal difference of the pixels is 1. However, when adjacent geometry samples in the 1D geometry signal are placed at pixels in different rows, the pixels have significant horizontal difference (e.g., greater than 1). For example, the $12^{th}$ geometry sample in the 1D geometry signal is placed at the last pixel in the first row, the $13^{th}$ geometry sample in the 1D geometry signal is placed at the first pixel in the second row, and the horizontal difference of the two pixels is 11 (also referred to as a horizontal jump of 11). The order in the portion (701) is referred to as a jumpy horizontal raster scan order. Specifically, the order in the portion (701) has 7 jumps of 11 that are shown as dash lines.

It is noted that while the portion (701) in FIG. 7 has eight rows and each row has 12 pixels, the technique can be used in any suitable number of rows and any suitable number of pixels in each row.

According to some aspects of the disclosure, neighboring values in the geometry (color) signal corresponding to the missed points may correspond to geometry samples of nearby missed points, and thus maybe close. Thus, arranging neighboring values of the 1D signal for missed points in neighborhood region of the 2D image may result in similar values for pixels in the neighborhood region, and can result in improvement of coding efficiency of both lossless and lossy cases.

Figure 8:
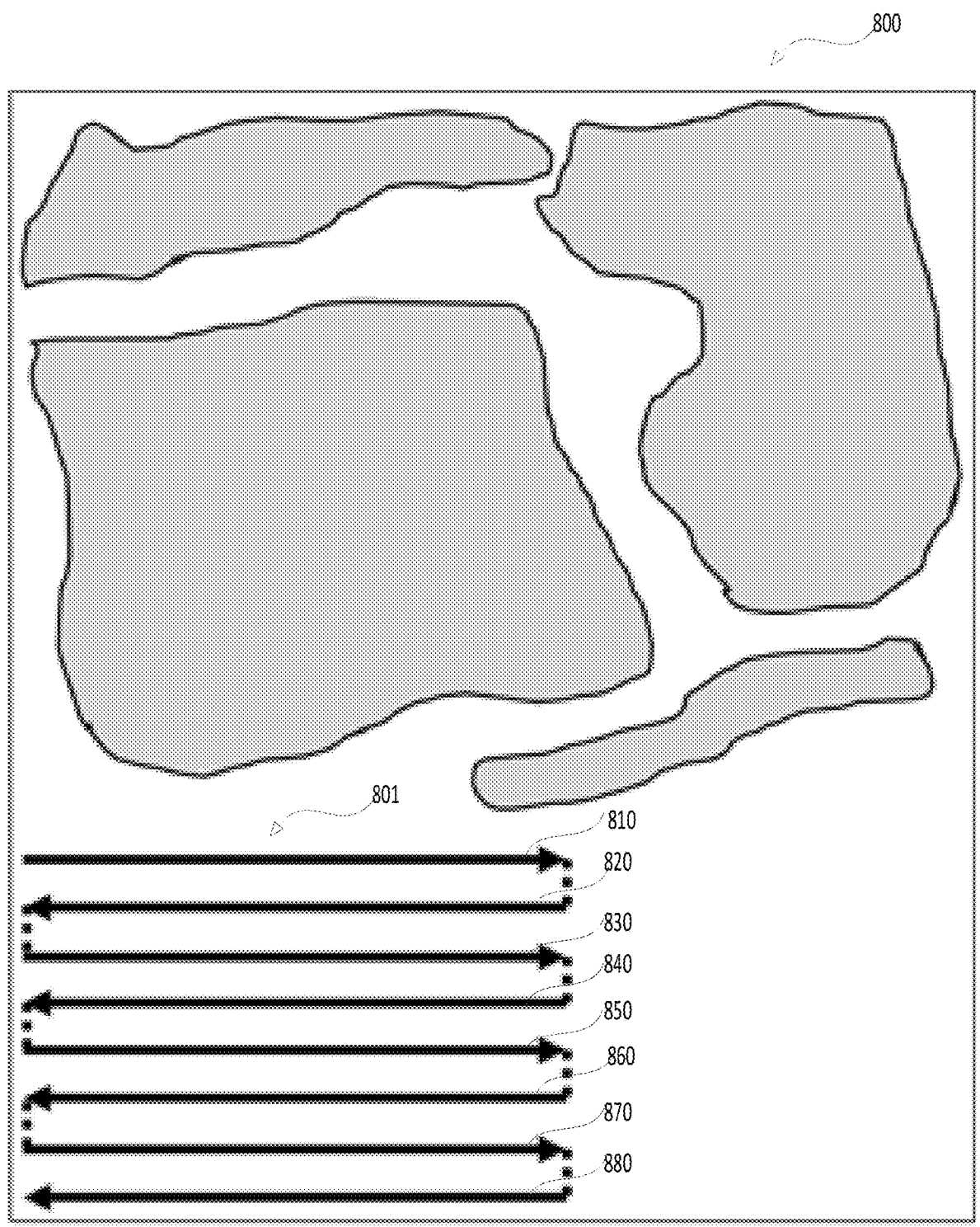
FIG. 8 shows a diagram illustrating a two-dimensional (2D) image.

FIG. 8 shows a diagram illustrating a 2D image (800) and a portion (801) with an arrangement of a geometry signal of 1D. The 2D image (800) can be a geometry image or one of the texture images for a point cloud, and the geometry image can be used for example. The 2D image (800) includes an upper portion that corresponds to one or more patches, such as geometry information of points in the one or more patches. The 2D image (800) includes the portion (801) that is disposed at a bottom portion of the 2D image (800), the portion (801) corresponds to missed points by the one or more patches from the point cloud.

In the portion (801), squares represent pixels of the image (either geometry or texture image) for the missed points. Jumps between consecutive rows are minimal and correlated samples are kept close together. Generally, when an arrangement assigns any two consecutive samples in a 1D signal to two neighboring units (e.g., pixels, blocks and the like), the arraignment is referred to as a non-jumpy scan. The two neighboring units can be neighbors in a same row of units or neighbors in a same column of units.

Specifically, in the portion (801), the geometry signal is arranged into a 2D image following an order of arrow lines (810), (820), (830), (840), (850), (860), (870) and (880). Specifically, arrow line (810) indicates an arrangement of the first 12 geometry samples in the geometry signal into a first row of pixels of the portion (801) from left to right; arrow line (820) indicates an arrangement of the second 12 geometry samples in the geometry signal into a second row of pixels of the portion (801) from right to left; arrow line (830) indicates an arrangement of the third 12 geometry samples in the geometry signal into a third row of pixels of the portion (801) from left to right; arrow line (840) indicates an arrangement of the fourth 12 geometry samples in the geometry signal into a fourth row of pixels of the portion (801) from right to left; arrow line (850) indicates an arrangement of the fifth 12 geometry samples in the geometry signal into a fifth row of pixels of the portion (801) from left to right; arrow line (860) indicates an arrangement of the sixth 12 geometry samples in the geometry signal into a sixth row of pixels of the portion (801) from right to left; arrow line (870) indicates an arrangement of the seventh 12 geometry samples in the geometry signal into a seventh row of pixels of the portion (801) from left to right; and arrow line (880) indicates an arrangement of the eighth 12 geometry samples in the geometry signal into an eighth row of pixels of the portion (801) from right to left.

In the FIG. 8 example, the arrow lines (810), (820), (830), (840), (850), (860), (870) and (880) correspond to horizontal scan order for arranging the geometry samples in the geometry signal. The arrow lines (810), (820), (830), (840), (850), (860), (870) and (880) alternate the scan directions. In the FIG. 8 example, adjacent geometry samples in the 1D geometry signal are disposed in pixels in the portion (801) as horizontal neighbors or vertical neighbors. When adjacent geometry samples in the 1D geometry signal are disposed at pixels in the same row, the adjacent geometry samples are horizontal neighbors, and the horizontal difference of the pixels is 1. When adjacent geometry samples in the 1D geometry signal are placed at pixels in different rows, the pixels have same horizontal value and the vertical difference is 1, and are vertical neighbors. For example, the $12^{th}$ geometry sample in the 1D geometry signal is placed at the last pixel in the first row, the $13^{th}$ geometry sample in the 1D geometry signal is placed at the last pixel in the second row, and the horizontal difference of the two pixels is 0 and the vertical difference of the two pixel is 1. The order in FIG. 8 is referred to as a non-jumpy horizontal raster scan order.

It is noted that while the portion (801) in FIG. 8 has eight rows and each row has 12 pixels, the technique can be used in any suitable number of rows and any suitable number of pixels in each row.

According to an aspect of the disclosure, using the non-jumpy horizontal raster scan order, the more correlated samples in 3D space (which are closer together in 3D) are placed in closer pixels in the 2D. This placement can improve the performance of prediction tools adopted in video compression codecs.

Figure 9A:
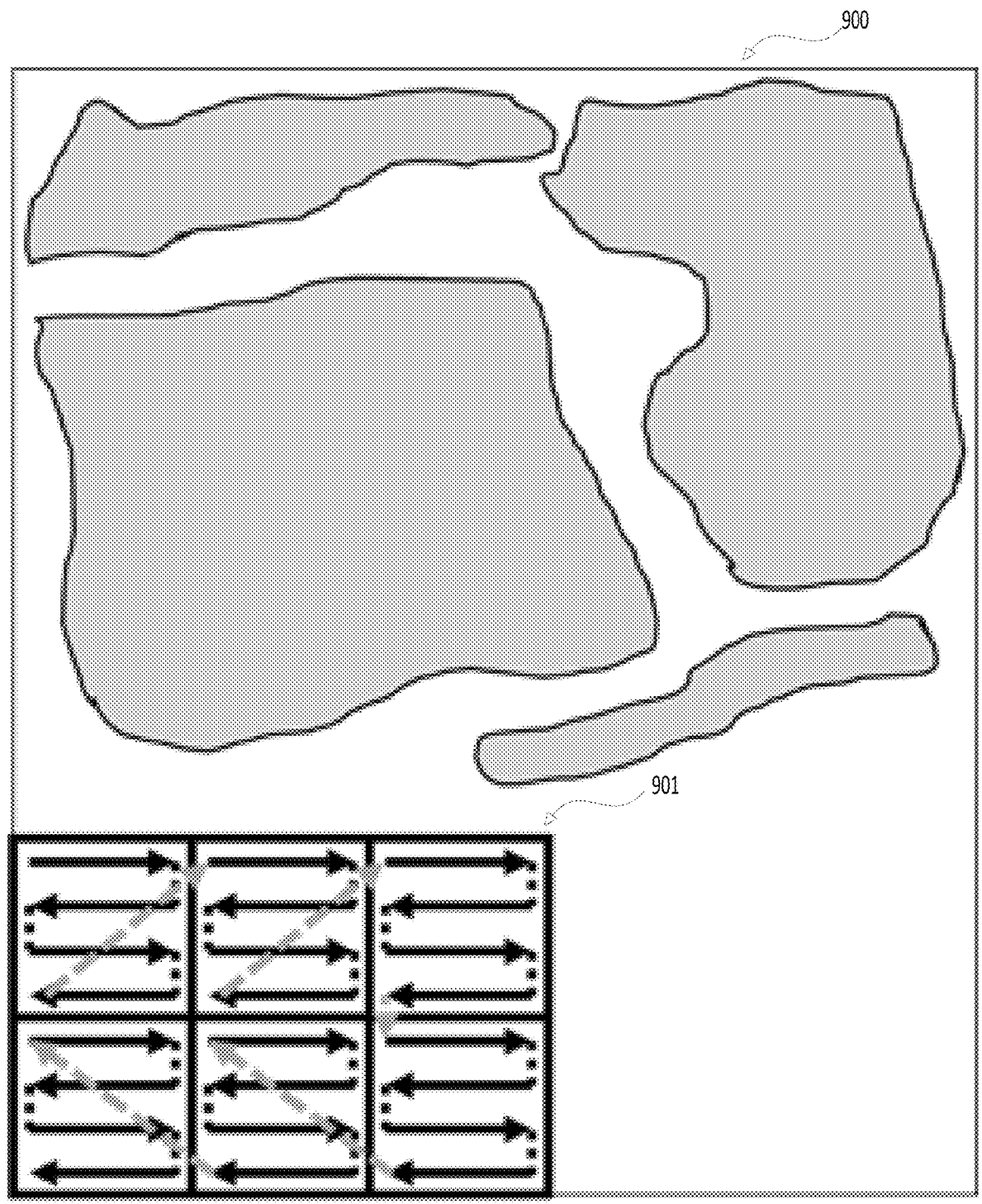
FIGS. 9A-B show diagrams illustrating a two-dimensional (2D) image.
Figure 9B:
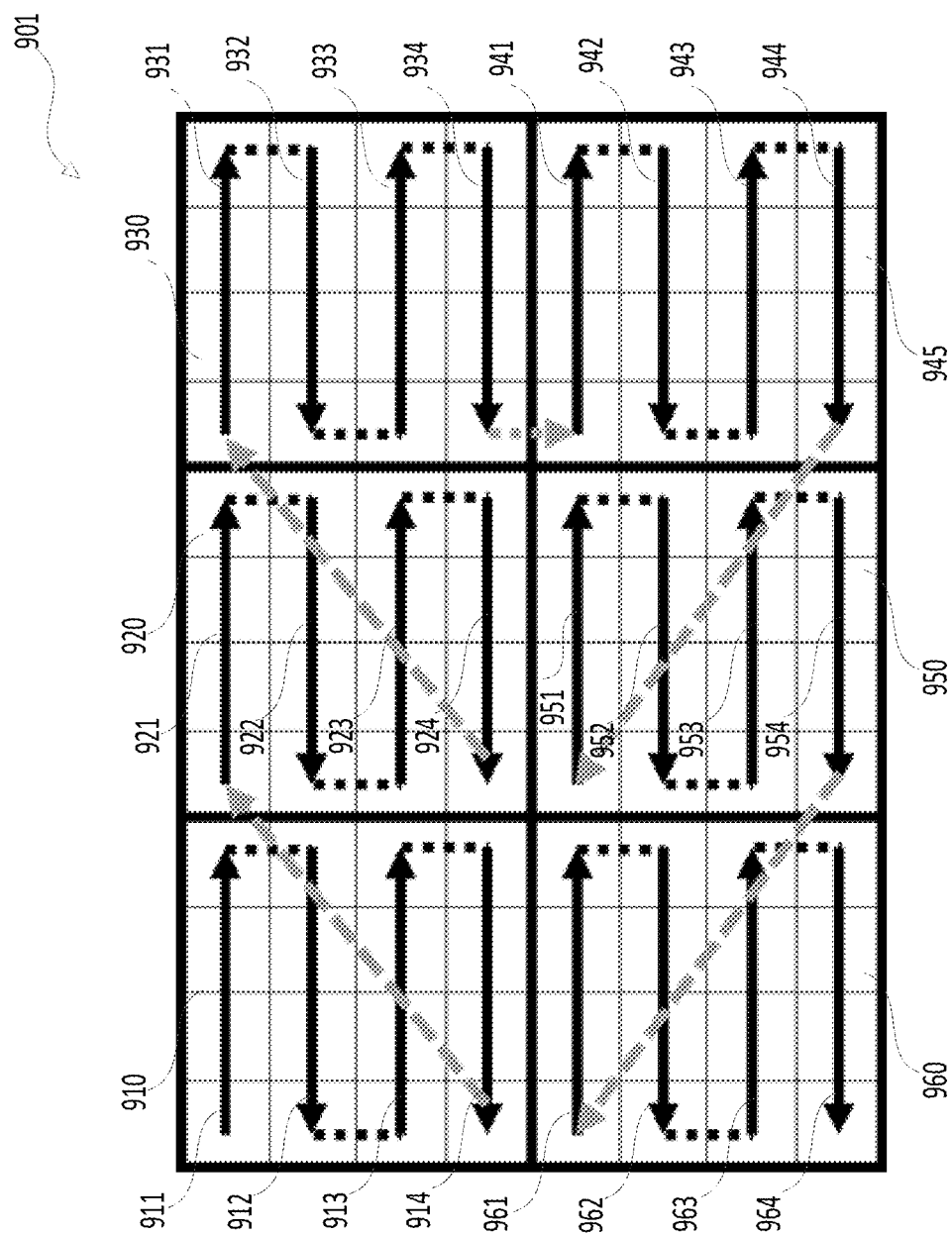

FIG. 9A shows a diagram illustrating a 2D image (900) and a portion (901) with an arrangement of a geometry signal of 1D into the 2D, and FIG. 9B shows the details of the portion (901). The 2D image (900) can be a geometry image or one of the texture images for a point cloud, and the geometry image can be used for example. The 2D image (900) includes an upper portion that corresponds to one or more patches, such as geometry information of points in the one or more patches. The 2D image (900) includes the portion (901) that is disposed at a bottom portion of the 2D image (900), the portion (901) corresponds to missed points by the one or more patches from the point cloud.

In the portion (901) shown by FIG. 9B, squares represent pixels of the image (either geometry or texture image) for the missed points. In this example, the image is divided into blocks of size 4×4. These blocks are scanned in non-jumpy scan order. In addition, inside each block, samples are scanned in non-jumpy scan order.

In the FIG. 9B example, according to the arrangement, the portion (901) is divided into blocks of square shapes. Samples of the 1D geometry signals are disposed to the blocks in a non-jumpy horizontal raster order of the blocks. Further, within each block, samples are disposed on the pixels following the non-jumpy horizontal raster scan order.

Specifically, the portion (901) is divided into blocks (910), (920), (930), (940), (950) and (960), and each block has 4×4 pixels. Samples in the geometry signal are disposed to the blocks in an order of block (910), block (920), block (930), block (940), block (950) and block (960). Within block (910), samples of the geometry signal are arranged following a non-jumpy horizontal raster scan order, such as shown by the arrow lines (911), (912), (913) and (914). Within block (920), samples of the geometry signal are arranged following a non-jumpy horizontal raster scan order, such as shown by the arrow lines (921), (922), (923) and (924). Within block (930), samples of the geometry signal are arranged following a non-jumpy horizontal raster scan order, such as shown by the arrow lines (931), (932), (933) and (934). Within block (940), samples of the geometry signal are arranged following a non-jumpy horizontal raster scan order, such as shown by the arrow lines (941), (942), (943) and (944). Within block (950), samples of the geometry signal are arranged following a non-jumpy horizontal raster scan order, such as shown by the arrow lines (951), (952), (953) and (954). Within block (960), samples of the geometry signal are arranged following a non-jumpy horizontal raster scan order, such as shown by the arrow lines (961), (962), (963) and (964).

It is noted that while the portion (901) is divided into 4×4 blocks in the FIG. 9B, other suitable N×N blocks (e.g. 64×64, 32×32, etc.) can be used. The non-jumpy scan order shown in FIGS. 9A-B is referred to as block based non-jumpy horizontal raster scan order.

It is noted that the scan orders shown in FIGS. 7, 8, 9A-B can be used at the encoder side to form the image for the missed points, and can be used at the decoder side to decode the missed points from the coded bitstream.

In some embodiments, the arrangements of the samples for the missed points can be flexible and not dependent on the codec. For example, the compression tools for 2D operate by regions, such as coding units (CUs). In an example, a set of consecutive samples (corresponding to missed points) is disposed in a CU. Further, samples (corresponding to missed points) within a region (e.g., CU) are arranged in a way such that samples closer in 3D are put in neighboring locations in 2D. The arrangement could be signaled (e.g., by flags in the coded bitstream) from the encoder side to the decoder side.

In some embodiments, one or more flags can be used. In an example, non_jumpy_raster_scan_present_flag is used to indicate whether non-jumpy raster scan is used or not. For example, when non_jumpy_raster_scan_present_flag is true, non-jumpy raster scan may be used; and when non_jumpy_raster_scan_present_flag is false, non-jumpy raster scan is not used. Further, block_based_scan_present_flag is used to indicate whether the image is divided into blocks or not for scanning. For example, when block_based_scan_present_flag is true, the image is divided into blocks for scanning; and when block_based_scan_present_flag is false, the image is not divided into blocks for scanning. Further, non_jumpy_raster_scan is used to indicate whether the non jumpy raster scan is enabled or not. For example, when non_jumpy_raster_scan is true, non jumpy raster scan is enabled, and when non_jumpy_raster_scan is false, non jumpy raster scan is disabled. Further, in an embodiment, other suitable information related to the non-jumpy scan can be included in the coded bitstream. For example, block size is used to indicate the size of the blocks for block based non-jumpy raster scan. The value of block_size is in the range $[0, 2^{16}-1]$ in an example.

FIG. 10 shows a syntax example according to some embodiments of the disclosure. In the FIG. 10 example, when flexible missed point scan is enabled (e.g., flexible_missed_points scan enabled flag is true), two flags non_jumpy_raster_scan_present_flag and block_based_scan_present_flag are coded (encoded at the encoder side or decoded at the decoder side). When non_jumpy_raster_scan_present_flag is true, non_jumpy_raster_scan is coded (encoded at the encoder side or decoded at the decoder side). When block_based_scan_present_flag is true, block_size is coded (encoded at the encoder side or decoded at the decoder side).

In an example, at the decoder side, when non_jumpy_raster_scan is true, the decoder can decode the image for missed points according to the scan order in FIG. 8. When the block_based_scan_present_flag is true, the decoder decodes block_size and scans the samples according to the order in FIG. 9.

Figure 11:
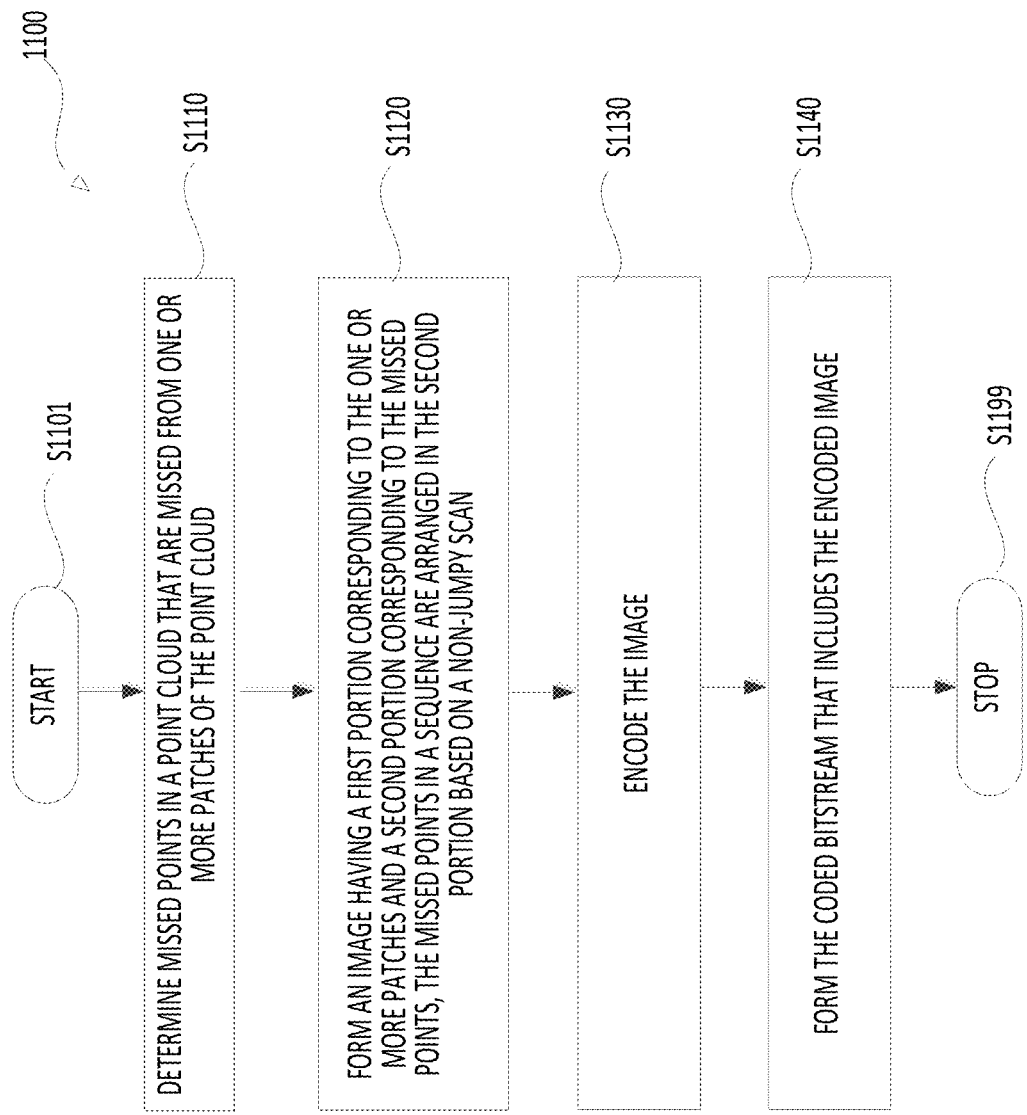
FIG. 11 shows a flow chart outlining a process example according to some embodiments of the disclosure.

FIG. 11 shows a flow chart outlining a process (1100) according to an embodiment of the disclosure. The process (1100) can be used during an encoding process for encoding point clouds. In various embodiments, the process (1100) is executed by processing circuitry, such as the processing circuitry in the terminal devices (110), the processing circuitry that performs functions of the encoder (203), the processing circuitry that performs functions of the encoder (300), and the like. In some embodiments, the process (1100) is implemented in software instructions, thus when the processing circuitry executes the software instructions, the processing circuitry performs the process (1100). The process starts at (S1101) and proceeds to (S1110).

At (S1110), missed points are determined. In some examples, after the patch generation, missed points by the one or more patches from 3D point cloud are determined.

At (S1120), a 2D image is formed. The 2D image has a first portion corresponding to the one or more patches and has a second portion corresponding to the missed points. The missed points are ordered in a sequence and are arranged in the second portion based on a non-jumpy scan. The missed points are suitably disposed into the second portion of the 2D image, such that 2-dimension distance between positions of two missed points in the 2D image is determined based on a 3D distance between the two missed points in the point cloud. In some examples, the geometry and color values of the missed points are put into separate images. In an example, a Kd-tree is created over the missed points and the missed points are scanned to form 1D signals based on the nearest neighborhood criteria. The scanning result includes a geometry signal and a color signal that are respectively one dimensional. For example, the missed points are sorted according to the scan of the Kd-tree based on the nearest neighborhood criteria. The geometry signal includes a sequence of geometry samples for the sorted missed points, and the color signal includes a sequence of color values for the sorted missed points. The samples in the 1D signals are disposed to form 2D images, such as a geometry image, three texture images for the color values, and the like according to a scan order, such as the scan order shown in FIG. 8 and FIG. 9B. In some examples, for the 1D geometry signal, the x, y and z values of a point can be sequentially put in; for the 1D color signal, color values can be put into three color planes (e.g., R plane, G plane and B plane).

At (S1130), the image is encoded using suitable compression tools. For example, the geometry image and the color images are respectively encoded.

At (S1140), a coded bitstream that includes the encoded images having the missed points is formed. In some embodiments, flags that are indicative the order to arrange the 1D signals into 2D can be included in the coded bitstream. Then, the process proceeds to (S1199) and terminates.

Figure 12:
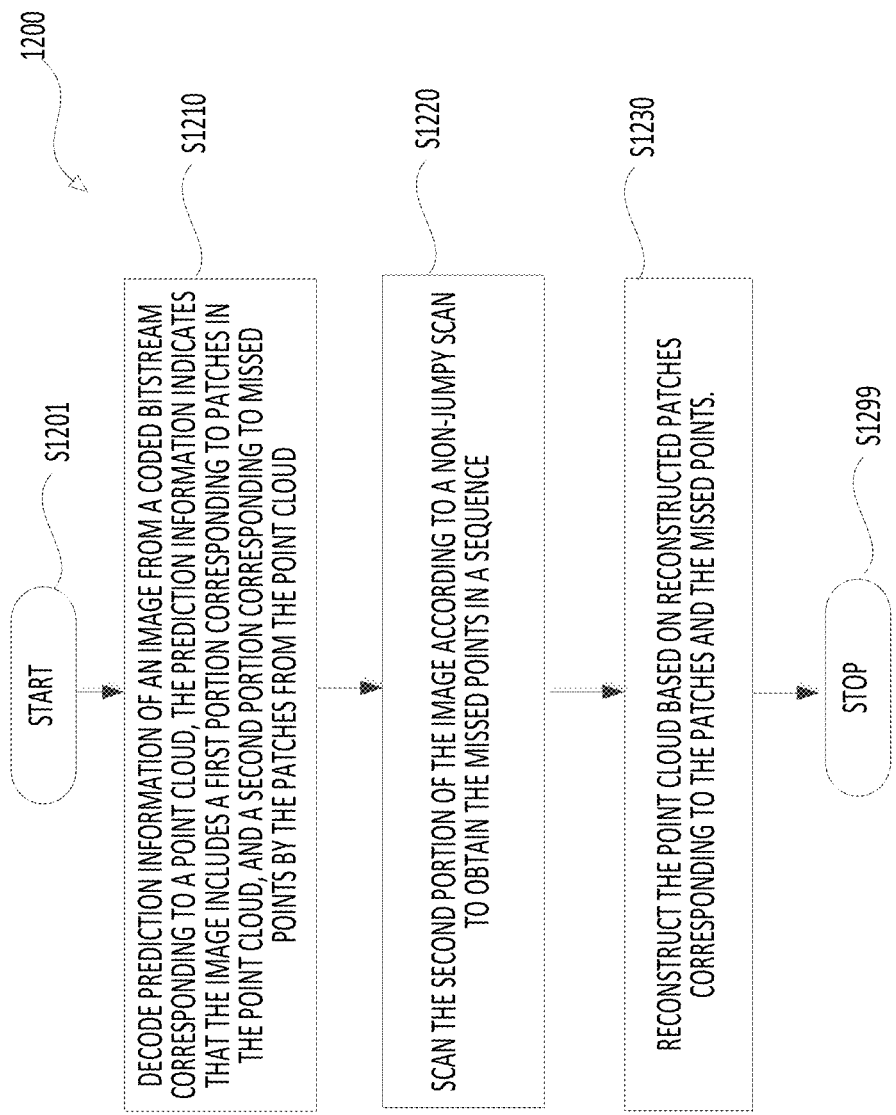
FIG. 12 shows a flow chart outlining a process example according to some embodiments of the disclosure.

FIG. 12 shows a flow chart outlining a process (1200) according to an embodiment of the disclosure. The process (1200) can be used during a decoding process for reconstructing point clouds. In various embodiments, the process (1200) is executed by processing circuitry, such as the processing circuitry in the terminal devices (120), the processing circuitry that performs functions of the decoder (210), the processing circuitry that performs functions of the decoder (400), and the like. In some embodiments, the process (1200) is implemented in software instructions, thus when the processing circuitry executes the software instructions, the processing circuitry performs the process (1200). The process starts at (S1201) and proceeds to (S1210).

At (S1210), prediction information of an image is decoded from a coded bitstream corresponding to a point cloud. The prediction information indicates that the image includes a first portion corresponding to patches in the point cloud, and includes a second portion corresponding to missed points by the patches from the point cloud.

At (S1220), the second portion of the image is scanned according to a non-jumpy scan to obtain the missed points in a sequence. In some embodiments, the prediction information indicates that the missed points are arranged in the image according to a non-jumpy scan. In an embodiment, flags and parameters are decoded from coded bitstream, such as the syntax shown in FIG. 10. The flags can indicate the non-jumpy scan. It is noted that the non-jumpy scan can be inferred.

In an example, the flags indicate a non-jumpy horizontal raster scan order as shown in FIG. 8. Then, when the image is decoded, the missed points can be obtained in the non-jumpy horizontal raster scan order as shown in FIG. 8. In another example, the flags indicate a block based non-jumpy horizontal raster scan order shown in FIG. 9. Then, when the image is decoded, the missed points can be obtained in the block based non-jumpy horizontal raster scan order as shown in FIG. 9.

At (S1230), the point cloud is reconstructed based on reconstructed patches corresponding to the patches and reconstructed missed points based on the sequence of the missed points. Then, the process proceeds to (S1299) and terminates.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
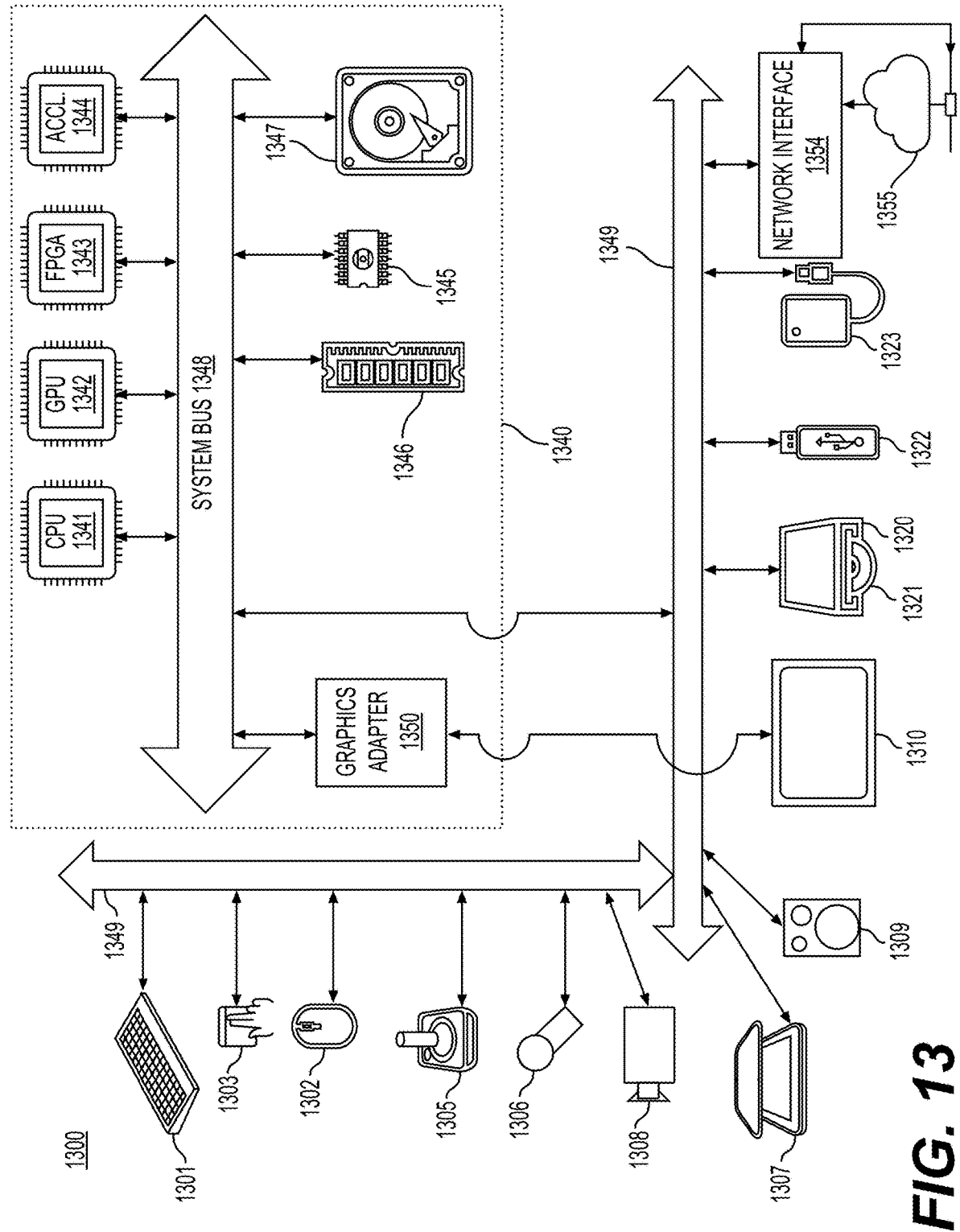
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for point cloud decompression, comprising:
    decoding, by processing circuitry from a coded bitstream, prediction information of an image corresponding to a point cloud, the prediction information indicating that the image includes a first portion corresponding to patches in the point cloud, and a second portion corresponding to missed points that are missing from the patches of the point cloud;
    reconstructing, by the processing circuitry, the image using the prediction information;
    scanning, by the processing circuitry, the second portion of the reconstructed image according to a non-jumpy scan to obtain a sequence of the missed points from the reconstructed image; and
    reconstructing, by the processing circuitry, the point cloud based on reconstructed patches corresponding to the patches and based on the sequence of the missed points.

2. The method of claim 1, further comprising:
    obtaining, by the processing circuitry, a first missed point as a last pixel of a first row in the second portion, and a second missed point that is next to the first missed point in the sequence as a first pixel of a second row in the second portion, the last pixel of the first row and the first pixel of the second row being in a same column.

3. The method of claim 1, further comprising:
    decoding, by the processing circuitry, a flag that is indicative of a block-based non-jumpy scan; and
    decoding, by the processing circuitry, a block size for the block-based non-jumpy scan.

4. The method of claim 1, further comprising:
    dividing, by the processing circuitry, the second portion into blocks according to a block size; and
    scanning, by the processing circuitry, missed points within a block according to the non-jumpy scan.

5. The method of claim 4, wherein a top-left corner of the second portion divided by the processing circuitry has a rectangular shape and has a horizontal coordinate and a vertical coordinate that both are multiples of the block size.

6. The method of claim 4, further comprising:
    obtaining, by the processing circuitry, a first missed point as a last pixel in a. first row of the block, and a second missed point that is adjacent to the first missed point in the sequence as a first pixel in a second row of the block, the last pixel in the first row and the first pixel in the second row being in a same column.

7. The method of claim 4, further comprising:
    processing, by the processing circuitry, the blocks in an order according to the non-jumpy scan of the blocks.

8. A method for point cloud compression, comprising:
    determining, by processing circuitry, missed points in a point cloud that are missed from one or more patches of the point cloud;
    forming, by the processing circuitry, an image having a first portion corresponding to the one or more patches and a second portion corresponding to the missed points, the forming step including arranging a sequence of the missed points in the second portion based on a non-jumpy scan, prior to encoding the image:
    encoding the image; and
    forming a coded bitstream that includes the encoded image.

9. The method of claim 8, further comprising:
    ordering, by the processing circuitry, the missed points into the sequence of missed points based on a nearest neighbor criterion; and
    associating, by the processing circuitry, the sequence of missed points to pixels of the second portion according to the non-jumpy scan.

10. The method of claim 9, further comprising:
    associating, by the processing circuitry, a first missed point to a last pixel in a. first row of the second portion; and
    associating, by the processing circuitry, a second missed point that is next to the first missed point in the sequence of missed points to a first pixel in a second row of the second portion, the last pixel in the first row and the first pixel in the second row being in a same column.

11. The method of claim 9, further comprising:
    associating, by the processing circuitry, a first missed point to a last pixel in a first row of a block in the second portion; and
    associating, by the processing circuitry, a second missed point that is next to the first missed point in the sequence of missed points to a first pixel in a second row of the block in the second portion, the last pixel in the first row and the first pixel in the second row being in a same column.

12. The method of claim 11, further comprising:
    including a flag indicative of the non-jumpy scan in the coded bitstream; and
    including a block size in the coded bitstream.

13. The method of claim 11, further comprising:
    disposing the second portion of a rectangular shape into the image with a top-left corner of the second portion having both a horizontal coordinate and a vertical coordinate being multiples of a block size.

14. An apparatus for point cloud decompression, comprising:
    processing circuitry configured to:
        decode, from a coded bitstream, prediction information of an image corresponding to a point cloud, the prediction information indicating that the image includes a first portion corresponding to patches in the point cloud, and a second portion corresponding to missed points that are missing from the patches of the point cloud;
reconstruct the image using the prediction information;
scan the second portion of the reconstructed image according to a non jumpy scan to obtain a sequence of the missed points; and
reconstruct the point cloud based on reconstructed patches corresponding to tine patches and based on the obtained sequence of the missed points.

15. The apparatus of claim 14, wherein the processing circuitry is further configured to:
obtain a first missed point as a last pixel of a first row in the second portion, and a second missed point that is next to the first missed point in the sequence as a first pixel of a second row in the second portion, the last pixel of the first row and the first pixel of the second row being in a same column.

16. The apparatus of claim 14, wherein the processing circuitry is further configured to:
decode a flag that is indicative of a block-based non-jumpy scan; and
decode a block size for the block-based non-jumpy scan.

17. The apparatus of claim 14, wherein the processing circuitry is further configured to:
divide the second portion into blocks according to a block size; and
scan the missed points within a block according to the non-jumpy scan.

18. The apparatus of claim 17, wherein a top-left corner of the second portion has a rectangular shape and has both a horizontal coordinate and a vertical coordinate being multiples of the block size of the blocks divided by the processing circuitry.

19. The apparatus of claim 17, wherein the processing circuitry is further configured to:
scan a first missed point as a last pixel in a first row of the block, and a second missed point that is adjacent to the first missed point in the sequence as a first pixel in a second row of the block, the last pixel in the first row and the first pixel in the second row being in a same column.

20. The apparatus of claim 17, wherein the processing circuitry is further configured to:
process the blocks in an order according to the non-jumpy scan of the blocks.

\* \* \* \* \*